H. LANGE.
BAG WHEELBARROW WITH WEIGHING DEVICE.
APPLICATION FILED NOV. 11, 1907.
944,335.
Patented Dec. 28, 1909.
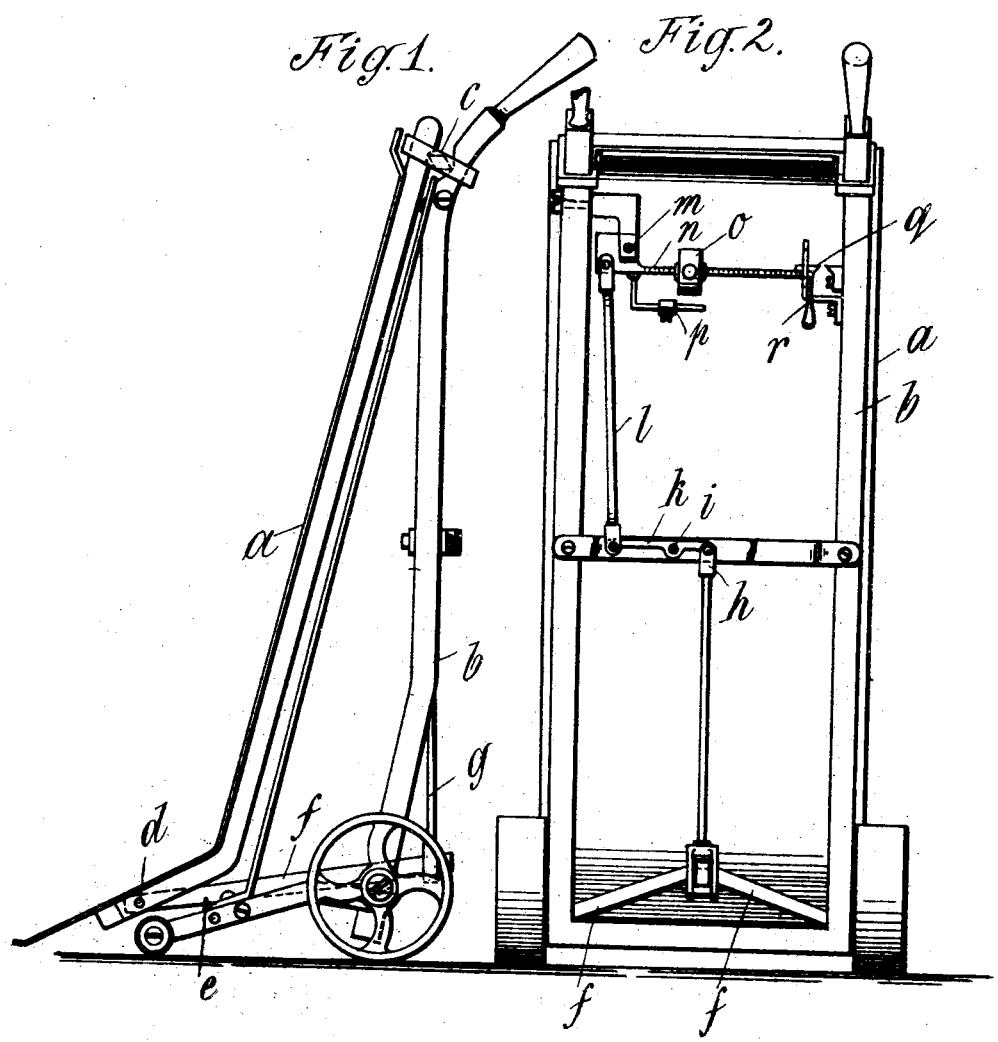

UNITED STATES PATENT OFFICE.

HANS LANGE, OF BERLIN, GERMANY.

BAG-WHEELBARROW WITH WEIGHING DEVICE.

944,335. Specification of Letters Patent. Patented Dec. 28, 1909.

Application filed November 11, 1907. Serial No. 401,650.

*To all whom it may concern:*

Be it known that I, HANS LANGE, a merchant and a subject of the German Emperor, and a resident of 39 Hagelsbergerstrasse, in the city of Berlin, Kingdom of Prussia, and German Empire, have invented a certain new and useful Bag-Wheelbarrow with Weighing Device, of which the following is a specification.

This invention has reference to a truck or wheel barrow, particularly for bags and the like which is combined with a scale or weighing device, whereby the advantage is produced of doing away with the necessity of weighing the goods to be shipped, on a separate scale, inasmuch as in my invention the weight of the bags and the like is indicated by the mere fact of loading the wheel-barrow. With this end in view the load carrier of the wheel-barrow is movably arranged in the frame and is connected to a weighing device, mounted below the load carrier and on which the weight of the goods may be read off each time.

An embodiment of my invention is shown by way of example on the accompanying drawing, in Figure 1 in side elevation and in Fig. 2 as seen from below.

The load support or carrier $a$ is movably supported on the barrow frame $b$ by means of a member $c$ provided with a knife edge, at the upper side of said frame and on the lower side of the same by means of a bar $d$ on the shorter arms of the two-armed levers $f$, mounted on the knife-edges $e$. On the point of connection of the two lever arms $f$ rests one end of a pitman $g$, the other forked end of which $h$ acts upon a stud on the shorter arm of a lever $k$, fulcrumed at $i$, and the longer arm of which is connected to a pitman rod $l$. This pitman is connected to the shorter arm of a lever $n$ fulcrumed at $m$ and provided with a sliding weight $o$, an adjusting device $p$ and a scale tongue $q$.

By means of an arresting device $r$ the weighing device can be arrested, so that the load carrier is immovably connected to the wheel barrow in transportation.

What I claim and desire to secure by Letters Patent of the United States is:—

In a wheel-barrow the combination of a fixed truck-frame ($b$); a load-carrier-frame ($a$); a link with knife-edges ($c$) supporting and connecting the upper end of the load-carrier-frame to the truck-frame; two two-arm levers ($f$) being supported movably by the truck-frame and which levers ($f$) are combined on their one end and support by their other diverted ends, the lower end of the load-carrier-frame; two knife-edges ($e$) arranged at the lower part of the truck-frame and supporting the two-arm-levers ($f$); an intermediating tow-arm-lever ($k$) hinged on the middle part of the truck-frame; a rod ($g$) connecting the combined ends of the two-arm-levers ($f$) to the one end of the intermediating two-arm-lever ($k$); a lever ($n$) with a sliding weight, said lever being hinged on the upper part of the truck arm; and a rod ($l$) connecting the other end of the intermediating two-arm lever ($k$) to the one end of the weighing lever ($n$).

In witness whereof I have hereunto signed my name this 29th day of October 1907, in the presence of two subscribing witnesses.

HANS LANGE.

Witnesses:
HENRY HASPER,
WOLDEMAR HAUPT.